United States Patent
Yoshioka et al.

(10) Patent No.: US 11,902,932 B2
(45) Date of Patent: Feb. 13, 2024

(54) USER EQUIPMENT

(71) Applicant: NTT DOCOMO, INC., Tokyo (JP)

(72) Inventors: Shohei Yoshioka, Tokyo (JP); Satoshi Nagata, Tokyo (JP); Huan Wang, Beijing (CN); Xiaolin Hou, Beijing (CN)

(73) Assignee: NTT DOCOMO, INC., Tokyo (JP)

(*) Notice: Subject to any disclaimer, the term of this patent is extended or adjusted under 35 U.S.C. 154(b) by 172 days.

(21) Appl. No.: 17/598,528

(22) PCT Filed: Apr. 2, 2019

(86) PCT No.: PCT/JP2019/014713
§ 371 (c)(1),
(2) Date: Sep. 27, 2021

(87) PCT Pub. No.: WO2020/202485
PCT Pub. Date: Oct. 8, 2020

(65) Prior Publication Data
US 2022/0182967 A1  Jun. 9, 2022

(51) Int. Cl.
*H04W 64/00* (2009.01)
*H04W 4/00* (2018.01)
(Continued)

(52) U.S. Cl.
CPC ............ *H04W 4/003* (2013.01); *H04L 1/1819* (2013.01); *H04L 5/0048* (2013.01); *H04W 4/46* (2018.02)

(58) Field of Classification Search
CPC ....... H04W 64/003; H04W 4/46; H04W 4/70; H04L 1/1819; H04L 5/0048
(Continued)

(56) References Cited

U.S. PATENT DOCUMENTS

| | | |
|---|---|---|
| 2014/0204741 A1 | 7/2014 | Ookubo et al. |
| 2017/0215183 A1* | 7/2017 | Gulati .................. H04L 1/1896 |
| 2017/0244501 A1 | 8/2017 | Yasukawa et al. |
| 2018/0205504 A1 | 7/2018 | Lyu et al. |
| 2021/0344454 A1* | 11/2021 | Lee ....................... H04L 1/1692 |

(Continued)

FOREIGN PATENT DOCUMENTS

| | | | |
|---|---|---|---|
| JP | 2002-135830 A | 5/2002 | |
| JP | 2013-046256 A | 3/2013 | |

(Continued)

OTHER PUBLICATIONS

Extended European Search Report issued in European Application No. 19922816.4, dated Sep. 29, 2022 (9 pages).

(Continued)

*Primary Examiner* — Hirdepal Singh
(74) *Attorney, Agent, or Firm* — Osha Bergman Watanabe & Burton LLP

(57) ABSTRACT

A user equipment includes a receiving unit configured to receive a physical control channel and a physical shared channel from another user equipment; a control unit configured to calculate a distance that is an estimated distance between the another user equipment and the user equipment, based on information acquired via the physical control channel; and a transmitting unit configured to determine whether to transmit, via a channel used for transmitting and receiving a response relating to retransmission control, the response relating to the retransmission control of the physical shared channel transmitted from the another user equipment, based on the calculated distance.

3 Claims, 12 Drawing Sheets

(51) Int. Cl.
*H04W 4/46* (2018.01)
*H04L 1/1812* (2023.01)
*H04L 5/00* (2006.01)

(58) Field of Classification Search
USPC .................................................... 455/456.1
See application file for complete search history.

(56) References Cited

U.S. PATENT DOCUMENTS

| | | | | |
|---|---|---|---|---|
| 2021/0392547 | A1* | 12/2021 | Tang | H04W 28/16 |
| 2022/0095186 | A1* | 3/2022 | Zhang | H04W 36/0044 |
| 2022/0214420 | A1* | 7/2022 | Assouline | H04L 5/0053 |

FOREIGN PATENT DOCUMENTS

| | | | |
|---|---|---|---|
| JP | 5865632 B2 | | 2/2016 |
| KR | 20200127827 A | * | 11/2020 |
| WO | 2011/093758 A1 | | 8/2011 |
| WO | 2016/060177 A1 | | 4/2016 |
| WO | 2017/045138 A1 | | 3/2017 |

OTHER PUBLICATIONS

Office Action issued in the counterpart Japanese Patent Application No. 2021-511845, dated Feb. 21, 2023 (4 pages).

International Search Report issued in PCT/JP2019/014713 dated Jun. 25, 2019 (5 pages).

Written Opinion of the International Searching Authority issued in PCT/JP2019/014713 dated Jun. 25, 2019 (4 pages).

Qualcomm Incorporated; "Physical layer procedures for HARQ operation for groupcast and unicast transmissions"; 3GPP TSG RAN WG1 Meeting #95, R1-1813422; Spokane, USA; Nov. 12-16, 2018 (6 pages).

Huawei, HiSilicon; "Design and contents of PSCCH and PSFCH"; 3GPP TSG RAN WG1 Meeting #95, R1-1813554; Spokane, USA; Nov. 12-16, 2018 (7 pages).

ZTE; "Geo based Resource Allocation for V2V over PC5"; 3GPP TSG-RAN WG2 Meeting #95, R2-165399; Göteborg, Sweden; Aug. 22-26, 2016 (5 pages).

3GPP TR 22.886 V15.1.0; "3rd Generation Partnership Project; Technical Specification Group Services and System Aspects; Study on enhancement of 3GPP Support for 5G V2X Services (Release 15)"; Mar. 2017 (58 pages).

3GPP TS 36.211 V15.4.0; "3rd Generation Partnership Project; Technical Specification Group Radio Access Network; Evolved Universal Terrestrial Radio Access (E-UTRA); Physical channels and modulation (Release 15)"; Dec. 2018 (240 pages).

Office Action issued in the counterpart Indian Patent Application No. 202117046286, dated Apr. 12, 2023 (6 pages).

Office Action issued in the counterpart Chinese Patent Application no. 201980094615.6, dated May 26, 2023 (16 pages).

* cited by examiner

USER EQUIPMENT

TECHNICAL FIELD

The present invention relates to a user equipment in a radio communication system.

BACKGROUND ART

In LTE (Long Term Evolution) and successor systems of LTE (for example, LTE-A (LTE Advanced) and NR (New Radio) (also referred to as 5G)), a D2D (Device to Device) technology in which user equipments directly communicate with each other without involving a base station apparatus, is being studied (for example, Non-Patent Literature 1).

D2D reduces the traffic between the user equipment and the base station apparatus, and enables communication between the user equipments even when the base station apparatus becomes unable to communicate in the event of a disaster, etc. Note that in 3GPP (3rd Generation Partnership Project), D2D is referred to as "sidelink"; however, in the present specification, D2D, which is a more general term, is used. However, sidelink is also used as necessary in the description of the embodiment to be described later.

D2D communication is generally classified into D2D discovery (also referred to as D2D detection) for finding other communicable user equipments and D2D communication (also referred to as D2D direct communication, inter-terminal direct communication, etc.) for user equipments to directly communicate with each other. In the following description, when D2D communication, D2D discovery, etc., are not particularly distinguished, these may be simply referred to as D2D. Further, a signal transmitted and received by D2D is referred to as a D2D signal. Various usage cases of services related to V2X (Vehicle to Everything) in NR have been studied (for example, Non-Patent Literature 2).

CITATION LIST

Non-Patent Literature

[NPTL 1] 3GPP TS 36.211 V15.4.0 (2018-12)
[NPTL 2] 3GPP TR 22.886 V15.1.0 (2017-03)

SUMMARY OF INVENTION

Technical Problem

In direct communication between terminals in NR-V2X, support of HARQ (Hybrid automatic repeat request) is being studied. In NR-V2X groupcast, depending on requirements for packet transmission, there are user equipments that do not need to transmit HARQ responses, and, therefore, there is a need to change the control relating to HARQ responses.

The present invention has been made in view of the above points, and an object of the present invention is to improve the efficiency of retransmission control in direct communication between terminals.

Solution to Problem

According to the disclosed technology, there is provided a user equipment including a receiving unit configured to receive a physical control channel and a physical shared channel from another user equipment; a control unit configured to calculate a distance that is an estimated distance between the another user equipment and the user equipment, based on information acquired via the physical control channel; and a transmitting unit configured to determine whether to transmit, via a channel used for transmitting and receiving a response relating to retransmission control, the response relating to the retransmission control of the physical shared channel transmitted from the another user equipment, based on the calculated distance.

Advantageous Effects of Invention

According to the disclosed technology, in direct communication between terminals, the efficiency of retransmission control can be improved.

DESCRIPTION OF EMBODIMENT

Hereinafter, an embodiment of the present invention will be described with reference to the drawings. Note that the embodiment described below is merely an example, and embodiments to which the present invention is applied are not limited to the following embodiment.

In the operation of the radio communication system according to an embodiment of the present invention, the existing technology is appropriately used. The existing technology is, for example, existing LTE; however, the existing technology is not limited to existing LTE. Furthermore, the term "LTE" used in the present specification shall have a broad meaning including LTE-Advanced and methods after LTE-Advanced (e.g., NR) or wireless LAN (Local Area Network) unless otherwise specified.

Furthermore, in the present embodiment, the duplex method may be the TDD (Time Division Duplex) method, the FDD (Frequency Division Duplex) method, or other methods (for example, the Flexible Duplex method).

Furthermore, in the embodiment of the present invention, the radio parameter, etc., being "configured" means that a predetermined value is "pre-configured", or a radio parameter, which is reported from the base station apparatus 10 or a user equipment 20, is configured.

Figure 1:
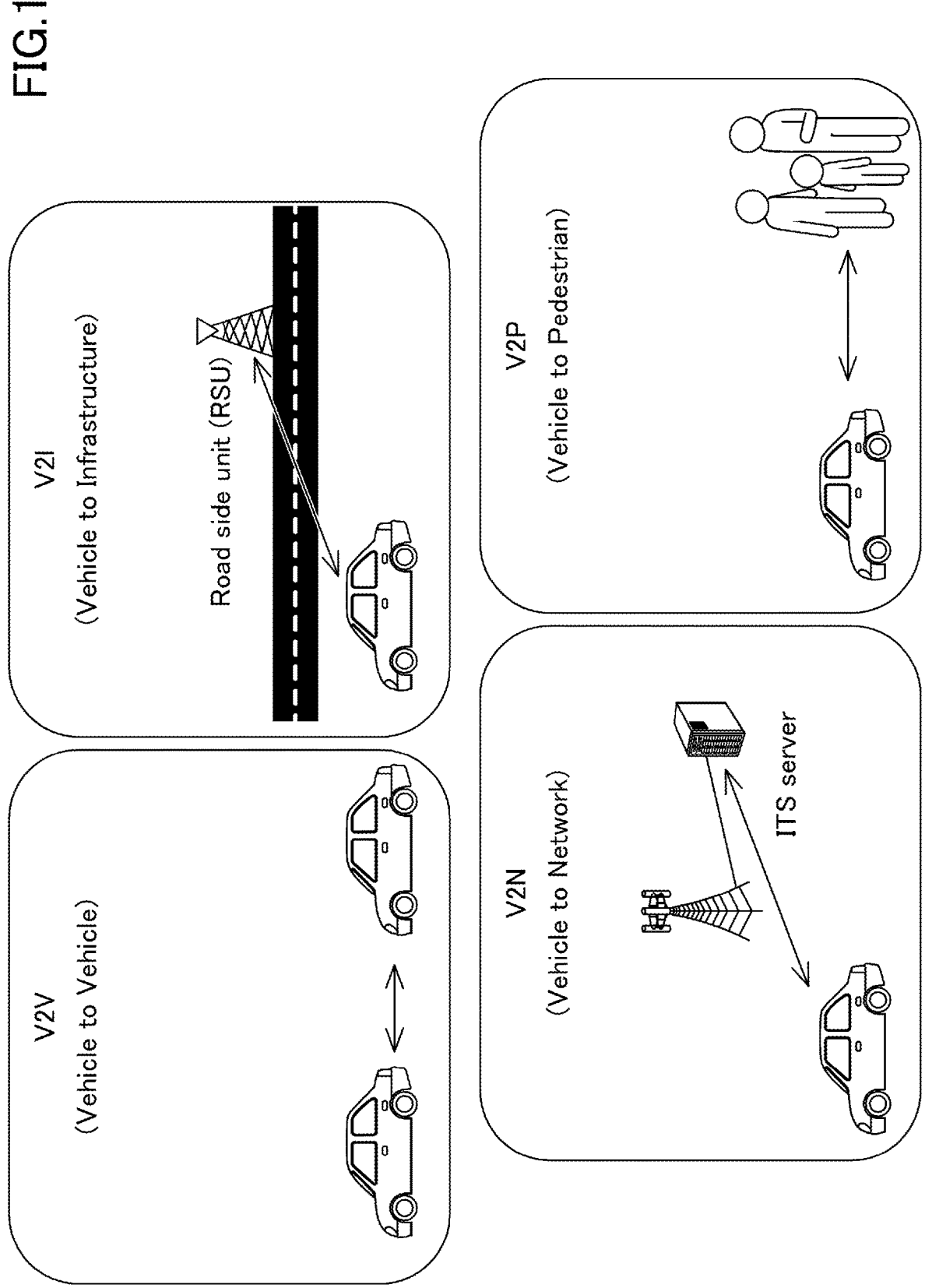
FIG. 1 is a diagram for describing V2X.

FIG. 1 is a diagram for describing V2X. In 3GPP, studies are being made to realize V2X (Vehicle to Everything) or eV2X (enhanced V2X) by extending the D2D function, and specifications of V2X are being made. As illustrated in FIG. 1, V2X is a part of ITS (Intelligent Transport Systems), and V2X is a collective term of V2V (Vehicle to Vehicle) meaning a communication mode implemented between vehicles, V2I (Vehicle to Infrastructure) meaning a communication mode implemented between a vehicle and a roadside unit (RSU) installed at the side of a road, V2N (Vehicle to Network) meaning a communication mode implemented between a vehicle and an ITS server, and V2P (Vehicle to Pedestrian) meaning a communication mode implemented between a vehicle and a mobile terminal of a pedestrian.

Furthermore, in 3GPP, V2X using cellular communication and inter-terminal communication of LTE or NR is being studied. V2X using cellular communication is also referred to as cellular V2X. In V2X of NR, studies are in progress for implementing larger capacity, low delay, high reliability, and QoS (Quality of Service) control.

For V2X of LTE or NR, it is assumed that studies not limited to the 3GPP specification, will be advanced. For example, it is assumed that securing interoperability, reducing costs by implementing an upper layer, a method of using a plurality of RATS (Radio Access Technology) in combination or a method of switching the RATS, addressing regulations in each country, acquiring and distributing data of a V2X platform of LTE or NR, and managing and using a database, will be studied.

In the embodiments of the present invention, a mode in which a communication apparatus is installed in a vehicle is mainly assumed; however, the embodiment of the present invention is not limited to such a mode. For example, the communication apparatus may be a terminal held by a person, or the communication apparatus may be an apparatus installed in a drone or an aircraft, or the communication apparatus may be a base station, an RSU, a relay station (relay node), or a user equipment having a scheduling capability, etc.

Note that SL (Sidelink) may be distinguished based on either UL (Uplink) or DL (Downlink) or one of or a combination of the following 1)-4). Furthermore, the SL may be another name.

1) Resource allocation in time domain
2) Resource allocation in the frequency domain
3) Synchronization signals (including SLSS (Sidelink Synchronization Signal)) to be referred to
4) Reference signals used for path loss measurement for transmission power control Further, with respect to OFDM (Orthogonal Frequency Division Multiplexing) of SL or UL, any one of CP-OFDM (Cyclic-Prefix OFDM), DFT-S-OFDM (Discrete Fourier Transform-Spread-OFDM), OFDM not subjected to transform precoding, or OFDM subjected to transform precoding may be applied.

In SL of LTE, Mode 3 and Mode 4 are specified with respect to resource allocation for SL to the user equipment 20. In Mode 3, transmission resources are dynamically allocated by DCI (Downlink Control Information) transmitted from the base station apparatus 10 to the user equipment 20. Furthermore, in Mode 3, SPS (Semi Persistent Scheduling) is also possible. In Mode 4, the user equipment 20 autonomously selects a transmission resource from the resource pool.

Note that a slot in embodiments of the present invention may be read as a symbol, a minislot, a subframe, a wireless frame, and a TTI (Transmission Time Interval). Further, a cell in embodiments of the present invention may be read as a cell group, a carrier component, a BWP, a resource pool, a resource, RAT (Radio Access Technology), a system (including wireless LAN), and the like.

Figure 2:
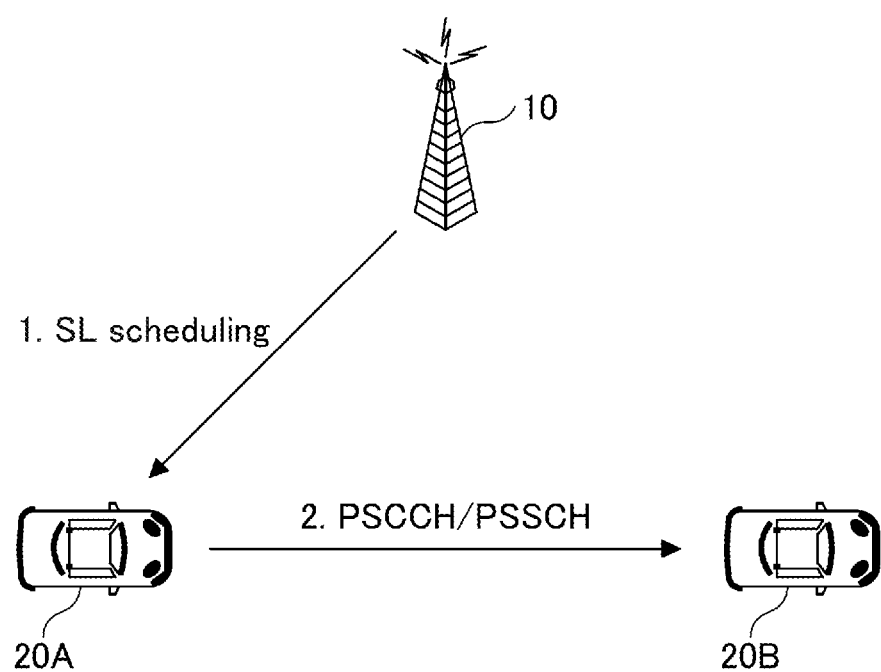
FIG. 2 is a diagram illustrating an example (1) of a transmission mode of V2X.

FIG. 2 is a diagram for describing an example (1) of a transmission mode of V2X. In the transmission mode of sidelink communication illustrated in FIG. 2, in step 1, a base station apparatus 10 transmits the sidelink scheduling to a user equipment 20A. Subsequently, the user equipment 20A transmits PSCCH (Physical Sidelink Control Channel) and PSSCH (Physical Sidelink Shared Channel) to a user equipment 20B based on the received scheduling (step 2). The transmission mode of the sidelink communication illustrated in FIG. 2 may be referred to as a sidelink transmission mode 3 in LTE. In the sidelink transmission mode 3 in LTE, Uu-based sidelink scheduling is performed. Uu is a wireless interface between UTRAN (Universal Terrestrial Radio Access Network) and UE (User Equipment). Note that the transmission mode of the sidelink communication illustrated in FIG. 2 may be referred to as a sidelink transmission mode 1 in the NR.

Figure 3:
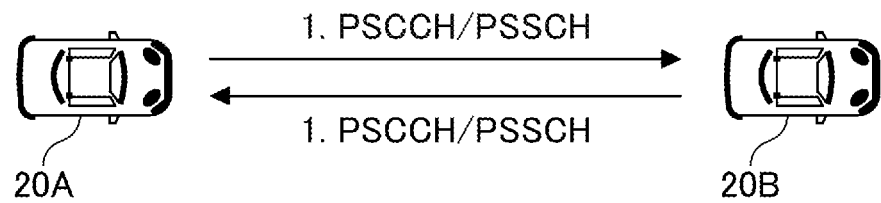
FIG. 3 is a diagram illustrating an example (2) of a transmission mode of V2X.

FIG. 3 is a diagram for describing an example (3) of a transmission mode of V2X. In the transmission mode for sidelink communication illustrated in FIG. 3, in step 1, the user equipment 20A transmits PSCCH and PSSCH to the user equipment 20B by using an autonomously selected resource. Similarly, the user equipment 20B transmits PSCCH and PSSCH to the user equipment 20A by using an autonomously selected resource (step 1). The transmission mode of the sidelink communication illustrated in FIG. 3 may be referred to as a sidelink transmission mode 2a in the NR. In the sidelink transmission mode 2 in the NR, the UE itself performs the resource selection.

Figure 4:
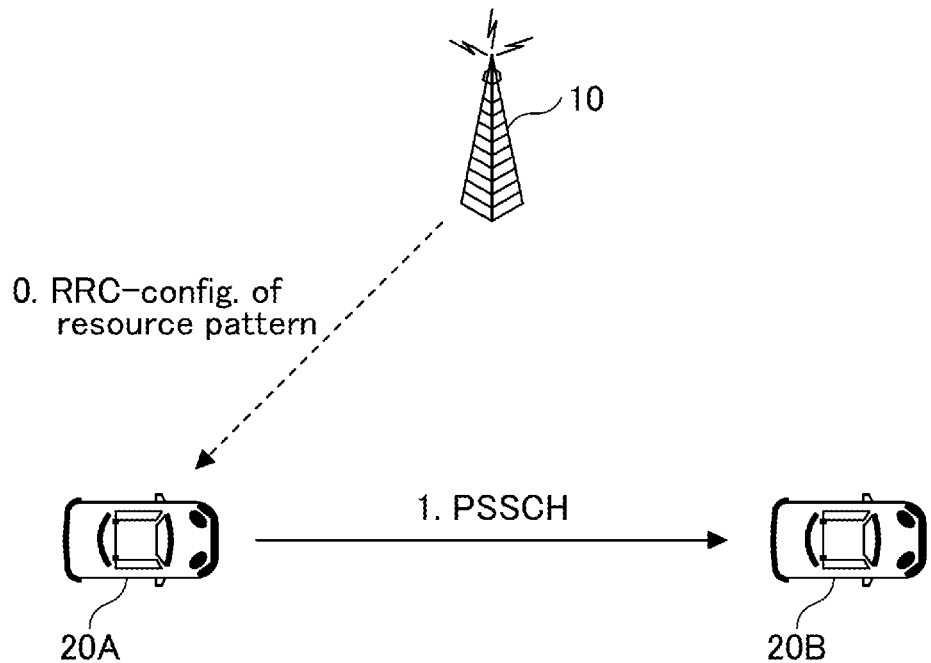
FIG. 4 is a diagram illustrating an example (3) of a transmission mode of V2X.

FIG. 4 is a diagram for describing an example (4) of a transmission mode of V2X. In the transmission mode of the sidelink communication illustrated in FIG. 4, in step 0, the base station apparatus 10 transmits a resource pattern of sidelink to the user equipment 20A via a RRC (Radio Resource Control) configuration. Subsequently, the user equipment 20A transmits the PSSCH to the user equipment 20B based on the received resource pattern (step 1). The transmission mode of the sidelink communication illustrated in FIG. 4 may be referred to as a sidelink transmission mode 2c in the NR.

Figure 5:
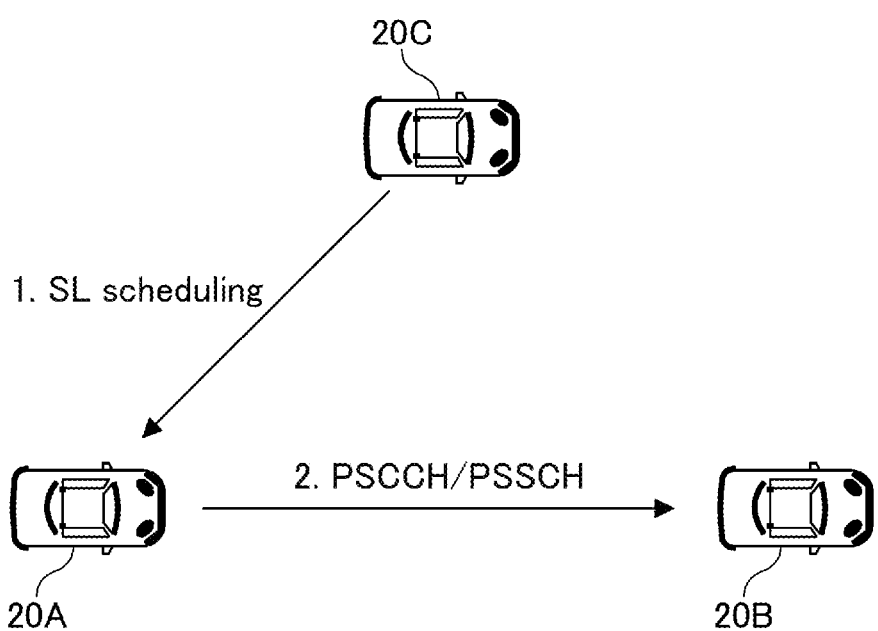
FIG. 5 is a diagram illustrating an example (4) of a transmission mode of V2X.

FIG. 5 is a diagram for describing an example (5) of a transmission mode of V2X. In the transmission mode of the sidelink communication illustrated in FIG. 5, in step 1, a user equipment 20C transmits the sidelink scheduling to a user equipment 20A via the PSCCH. Subsequently, the user equipment 20A transmits the PSSCH to the user equipment 20B based on the received scheduling (step 2). The transmission mode of the sidelink communication illustrated in FIG. 5 may be referred to as a sidelink transmission mode 2d in the NR.

Figure 6:
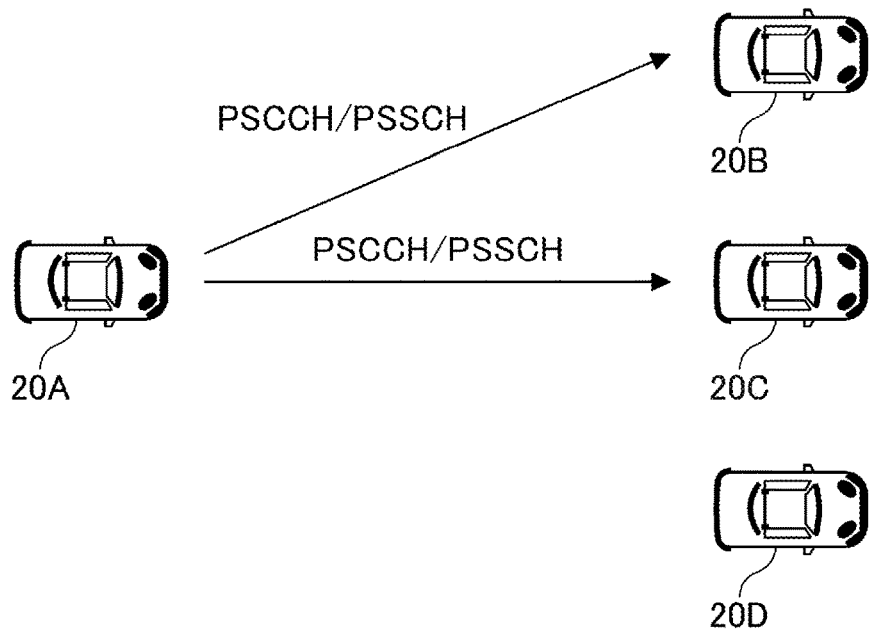
FIG. 6 is a diagram illustrating an example (1) of a communication type of V2X.

FIG. 6 is a diagram for describing an example (1) of a communication type of V2X. The sidelink communication type illustrated in FIG. 6 is unicast. The user equipment 20A transmits PSCCH and PSSCH to the user equipment 20. In the example illustrated in FIG. 6, the user equipment 20A performs unicast transmission to the user equipment 20B and performs unicast transmission to the user equipment 20C.

Figure 7:
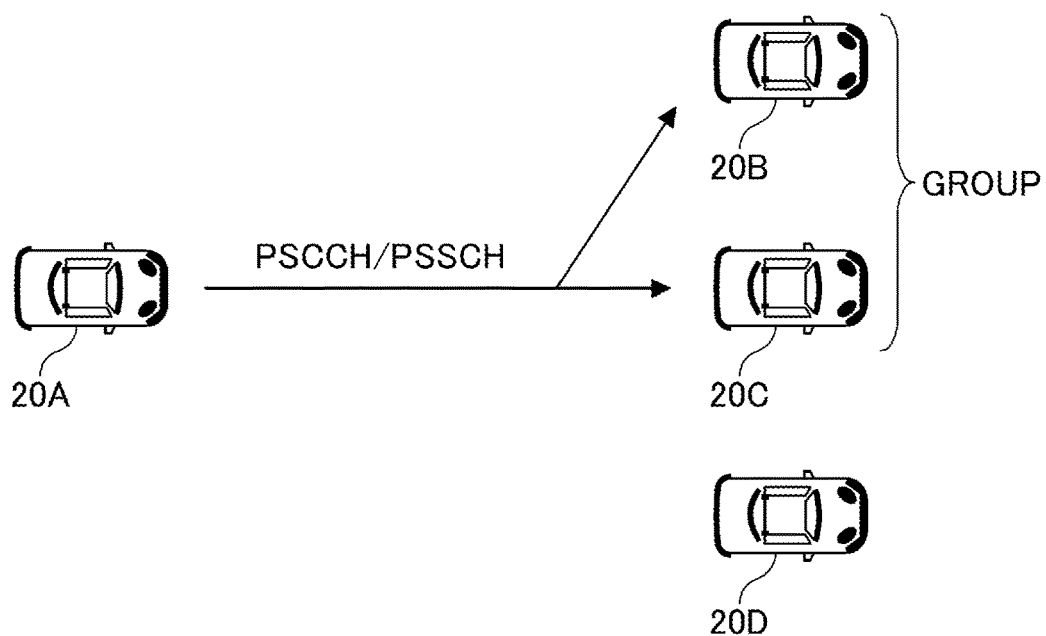
FIG. 7 is a diagram illustrating an example (2) of a communication type of V2X.

FIG. 7 is a diagram for describing an example (2) of a communication type of V2X. The sidelink communication type illustrated in FIG. 7 is a groupcast. The user equipment 20A transmits PSCCH and PSSCH to a group to which one or more of the user equipments 20 belong. In the example illustrated in FIG. 7, the group includes the user equipment 20B and the user equipment 20C, and the user equipment 20A performs groupcast transmission to the group.

Figure 8:
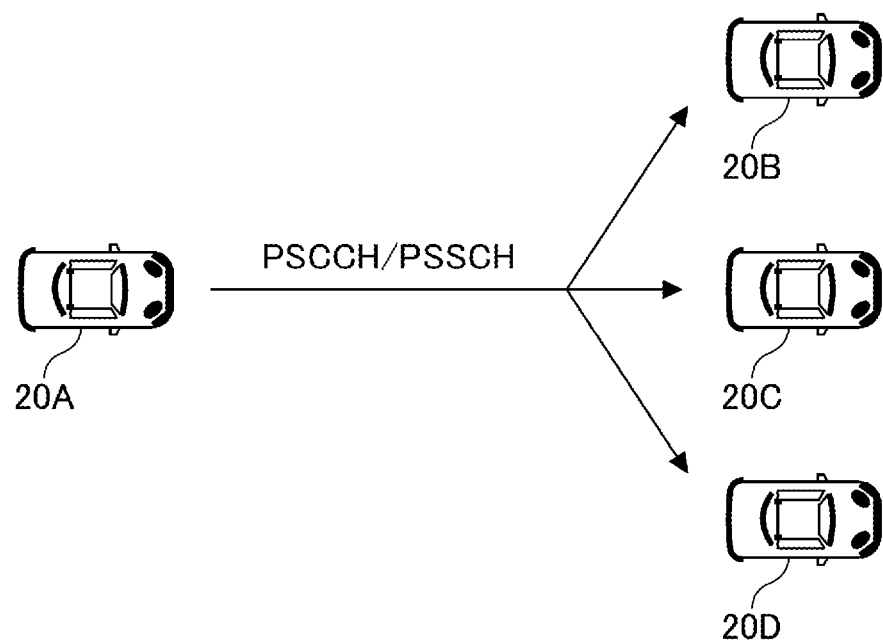
FIG. 8 is a diagram illustrating an example (3) of a communication type of V2X.

FIG. 8 is a diagram for describing an example (3) of a communication type of V2X. The sidelink communication type illustrated in FIG. 8 is broadcast. The user equipment 20A transmits PSCCH and PSSCH to one or more of the user equipments 20. In the example illustrated in FIG. 8, the user equipment 20A performs broadcast transmission to the user equipment 20B, the user equipment 20C, and a user equipment 20D.

Here, in sidelink groupcast, determination of whether to transmit a HARQ response by using the distance between the transmitting UE and the receiving UE or by the use of RSRP (Reference Signal Received Power), is supported. For example, the distance between the transmitting UE and the receiving UE may be explicitly signaled or may be implicitly extracted. Further, the accuracy of the resource arrangement or distance is being studied, in terms of using the distance or RSRP. The function of determining whether to transmit a HARQ response by using the distance between the transmitting UE and the receiving UE or RSRP, may be enabled or disabled.

Figure 9:
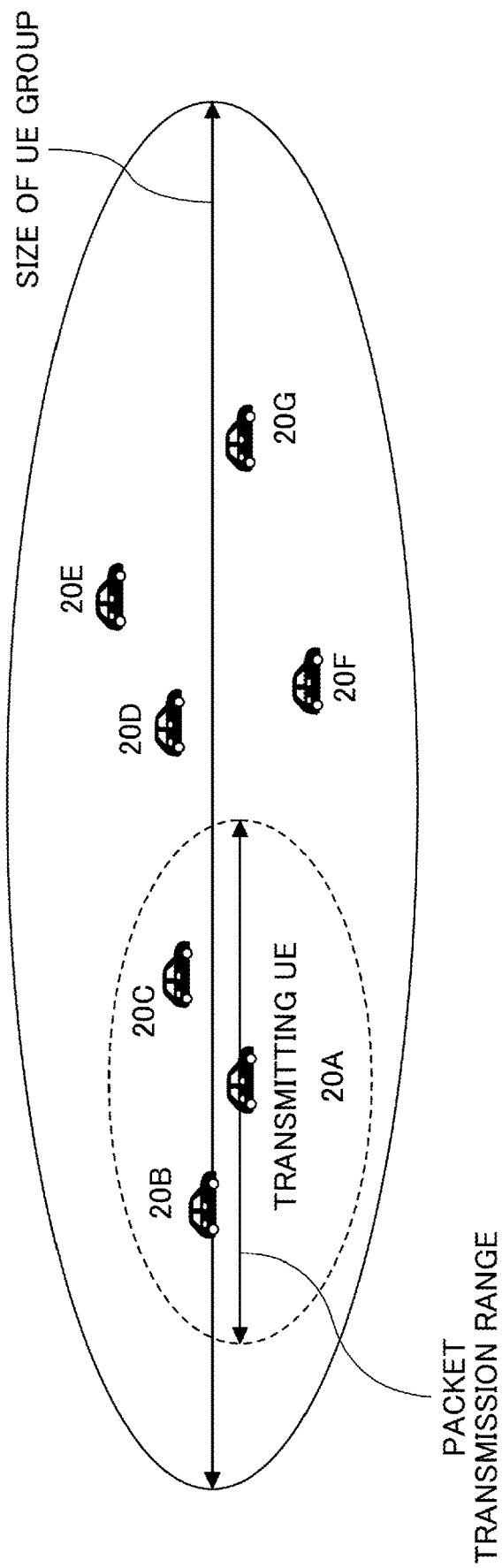
FIG. 9 is a diagram illustrating an example of packet transmission in V2X according to an embodiment of the present invention.

FIG. 9 is a diagram for describing an example of packet transmission in V2X according to an embodiment of the present invention. As illustrated in FIG. 9, a range of packet transmission centering around the transmitting UE 20A, may be specified as a requirement. The UE 20B and the UE 20C included in the packet transmission range need to transmit HARQ responses. On the other hand, the UE 20D, a UE 20E, a UE 20F, and a UE 20G, which are included in the UE group but are not included in the packet transmission range, do not need to transmit HARQ responses. Therefore, for the UE 20B and the UE 20C, there is a need to perform control to enable transmission of HARQ responses, and for the UE 20D, the UE 20E, the UE 20F, and the UE 20G, there is a need to perform control to disable transmission of HARQ responses.

Here, conventionally, it has not been clear as to how to determine how to execute a HARQ response by using the distance between the transmitting UE 20 and the receiving UE 20. Further, conventionally, it has not been clear as to how the receiving UE 20 determines the distance between the transmitting UE and the receiving UE. Further, conventionally, it has not been clear as to how the transmitting UE 20 reports the packet transmission range to the receiving UE 20. Further, conventionally, it has not been clear as to how to use RSRP to determine whether to execute a HARQ response.

Thus, the geographic location of the transmitting UE 20 may be reported via the SCI (Sidelink Control Information).

For example, the transmitting UE 20 may explicitly transmit position information of the user equipment (the transmitting UE 20) to the receiving UE 20 via the SCI. For example, a field indicating the longitude and latitude where the transmitting UE 20 is located, may be reported via the SCI. All of or a part of the information indicating the longitude and latitude may be reported by the field.

Figure 10:
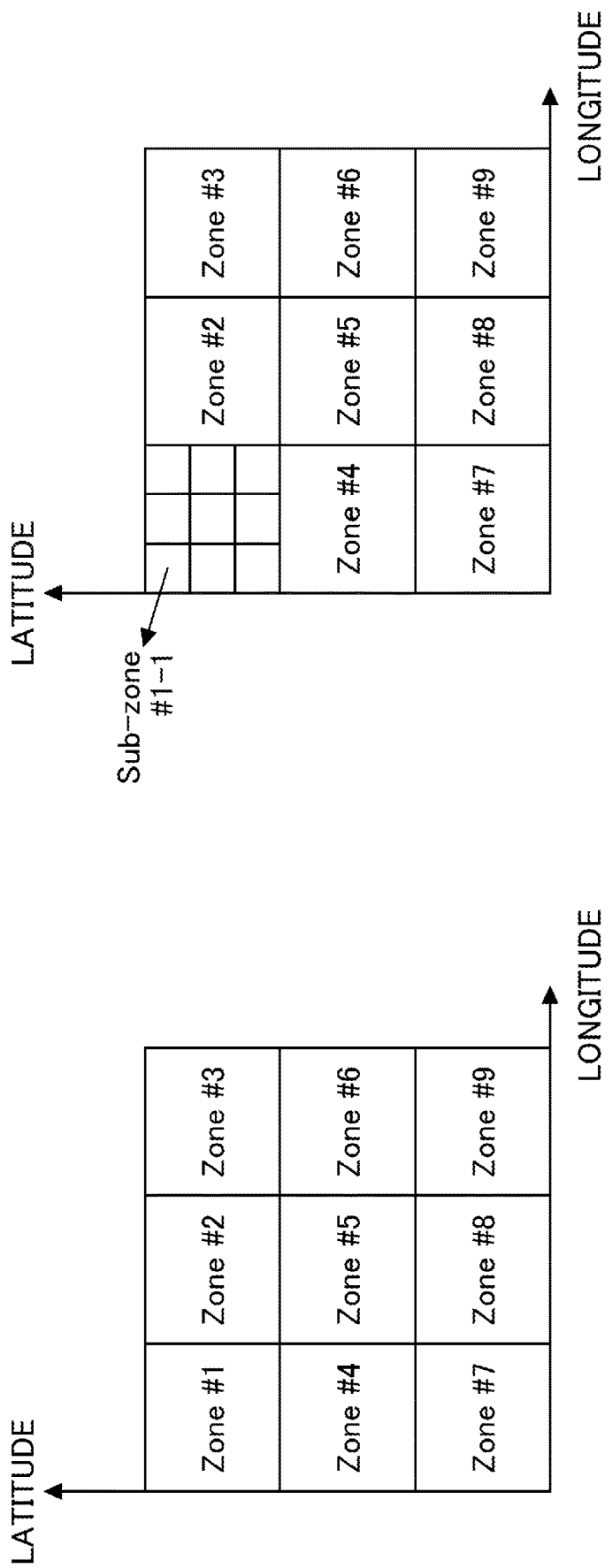
FIG. 10 is a sequence diagram illustrating an example of a zone in V2X according to an embodiment of the present invention.

FIG. 10 is a sequence diagram illustrating an example of zones in V2X according to an embodiment of the present invention. The transmitting UE 20 may transmit, to the receiving UE 20, a field indicating a zone ID via the SCI. The definition of a zone indicating a predetermined geographic range may be determined by reusing the definition of LTE-V2X. The size of the zone may be configured or specified in advance. For example, the size may be defined by a width corresponding to the latitude and a length corresponding to the longitude. The number of zones may be configured or specified in advance. For example, there may be a plurality of zones in the width direction, there may be a plurality of zones in the length direction, or there may be a plurality of zones in the width direction and in the length direction, respectively, as illustrated in FIG. 10. Each of the plurality of zones may be identified by a zone ID. The diagram on the left-hand side of FIG. 10 illustrates an example in which nine zones, from zone ID #1 to zone ID #9, are configured.

As illustrated in FIG. 10, a sub-zone may be defined. Sub-zones may be configured or specified in advance for each zone. For example, the number of sub-zones per zone may be configured or specified in advance in the width direction and in the length direction. For example, different sub-zones may be configured or specified in advance for each zone. By applying sub-zones, it is possible to use zones having different granularities, and the overhead associated with the reporting of zones can be reduced. A sub-zone may be identified by a sub-zone ID. The diagram on the right-hand side of FIG. 10 illustrates an example in which nine sub-zones, from a sub-zone ID #1-1 to a sub-zone ID #1-9, are configured in the zone ID #1.

The zone ID and the sub-zone ID at which the transmitting UE 20 is located, may be reported via a separate SCI field, or may be reported in a SCI field including other information by being combined with the other information and encoded. The receiving UE 20 calculates the distance between the transmitting UE 20 and the receiving UE 20 based on a reference point of the reported zone ID and the sub-zone ID. The reference point may be, for example, the center of a zone or sub-zone.

Note that when CAM (Cooperative Awareness Message) including the location, the speed, or the ID, etc., of the surrounding UEs 20, is shared among the UEs 20 that are close to each other, and the ID of the transmitting UE 20 is transmitted via the upper layer or the application layer, the receiving UE 20 can calculate the distance between the transmitting UE 20 and the receiving UE 20 based on the ID of the transmitting UE 20.

Further, the transmitting UE 20 may also report, to the receiving UE 20 via the SCI, the requirement of the range in which packets are transmitted and/or the transmission range. For example, one granularity indicating the transmission range may be defined, and the range specified by this granularity may be reported via the SCI. The granularity is, for example, meters. Further, a plurality of granularities indicating transmission ranges may be defined. One granularity among the plurality of granularities may be configured, and a range specified by this one granularity may be reported via the SCI. Further, a plurality of granularities indicating transmission ranges may be defined, and one granularity among the plurality of granularities and a range specified by this one granularity may be reported via the SCI.

Table 1 indicates an example where an index is assigned for each requirement of a range in which packets are transmitted. The index may be reported to the receiving UE 20 from the transmitting UE 20 via the SCI. The requirement of the range in which packets are transmitted corresponding to the index, is used as a threshold value for determining whether to execute a HARQ response at the receiving UE 20.

TABLE 1

| Requirement of range | Index |
|---|---|
| 100 m | 1 |
| 200 m | 2 |
| 500 m | 3 |
| 1000 m | 4 |

As indicated in Table 1, the requirement for the range in which packets are transmitted, may be specified as 100 m, 200 m, 500 m, and 1000 m. Index #1 corresponds to 100 m, index #2 corresponds to 200 m, index #3 corresponds to 500 m, and index #4 corresponds to 1000 m. Note that the requirement for the range in which packets are transmitted, may be specified by an area defined by a zone or a sub-zone.

Further, a number may be preliminarily assigned for each transmission range requirement above, and one number may be reported via the SCI. Further, the transmission range and/or a requirement of a transmission range may be reported by a specific field of the SCI, for example, together with a priority level or another parameter associated with the QoS.

The receiving UE 20 may calculate the distance between the user equipment and the transmitting UE 20, based on the position of the user equipment and the position of the transmitting UE 20. When the calculated distance exceeds the requirement of the transmission range reported via the SCI described above, the receiving UE 20 does not need to execute a HARQ response. Here, the position of the transmitting UE 20 may be reported from the transmitting UE 20 to the receiving UE 20 by the method described above.

A threshold value of power or RSRP used for determining the range in which packets are to be transmitted, may be configured or specified in advance. The threshold value may be reported from the transmitting UE 20 to the receiving UE 20 via the SCI. For example, when the receiving UE 20 receives a packet by RSRP below the reported threshold value, the receiving UE 20 does not need to execute a HARQ response.

Note that the transmitting UE 20 may report, to the receiving UE 20, the transmission power or the assumed path loss via the SCI. Further, a range in which packets are to be transmitted as indicated by an index in Table 1, may be reported from the transmitting UE 20 to the receiving UE 20 via the SCI. The receiving UE 20 may estimate the distance between the transmitting UE 20 and the receiving UE 20 based on the reported transmission power. For example, when the distance between the transmitting UE 20 and the receiving UE 20 estimated based on the reported transmission power exceeds the distance indicating the range in which the packets are to be transmitted reported via the SCI, the receiving UE 20 does not need to execute a HARQ response. For example, when the path loss of the received signal exceeds the assumed path loss reported via the SCI, the receiving UE 20 does not need to execute a HARQ response.

Figure 11:
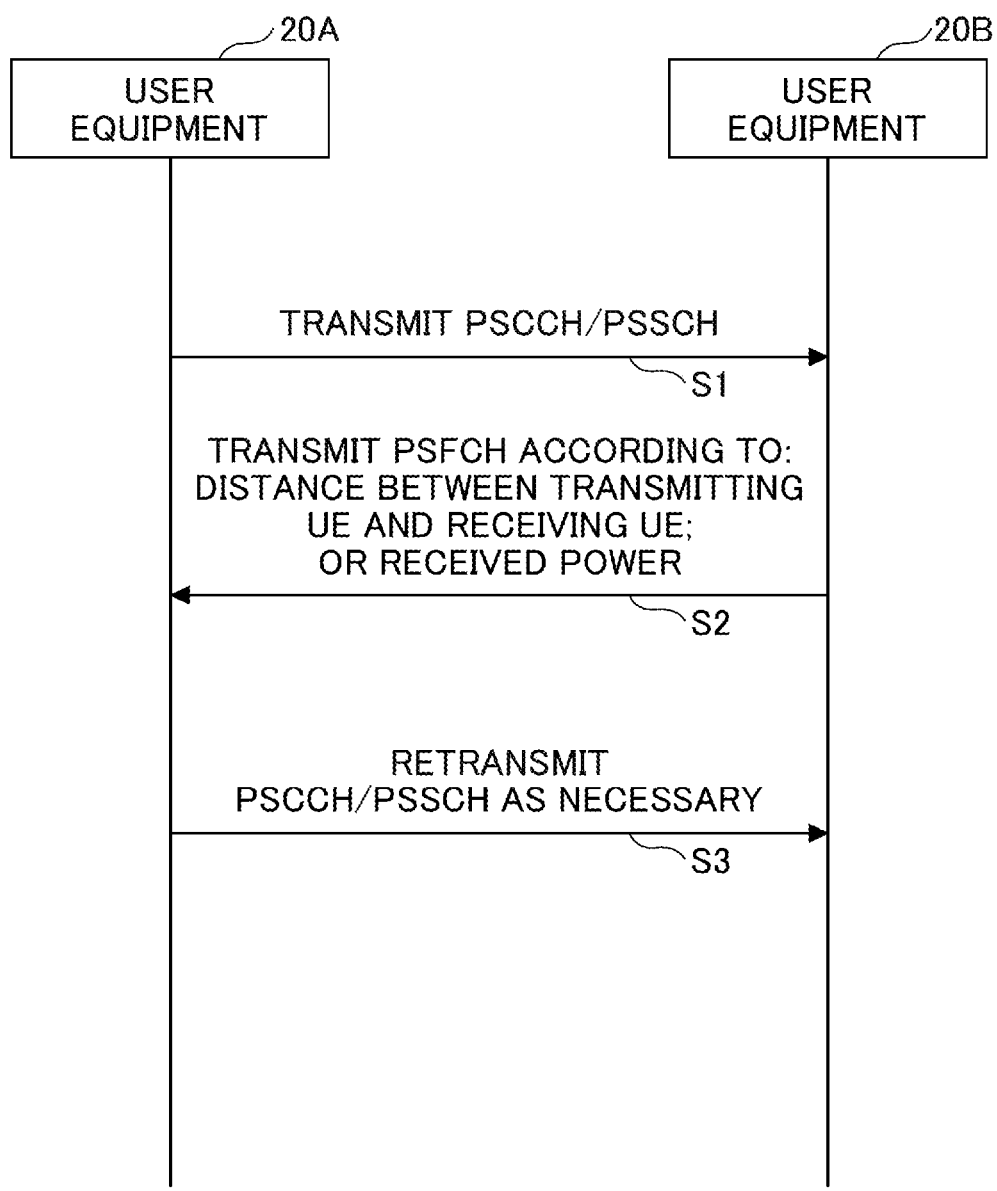
FIG. 11 is a sequence diagram illustrating an example of a HARQ response in V2X according to an embodiment of the present invention.

FIG. 11 is a sequence diagram illustrating an example of a HARQ response in V2X according to an embodiment of the present invention. In step S1, the user equipment 20A transmits PSCCH and PSSCH to the user equipment 20B. PSCCH includes the SCI described above. Subsequently, the user equipment 20B transmits PSFCH including a HARQ response to the user equipment 20A, according to the distance between the user equipment 20A and the user equipment 20B or received power (step S2). In step S3, the user equipment 20A retransmits PSCCH and PSSCH when the HARQ response requests retransmission.

Figure 12:
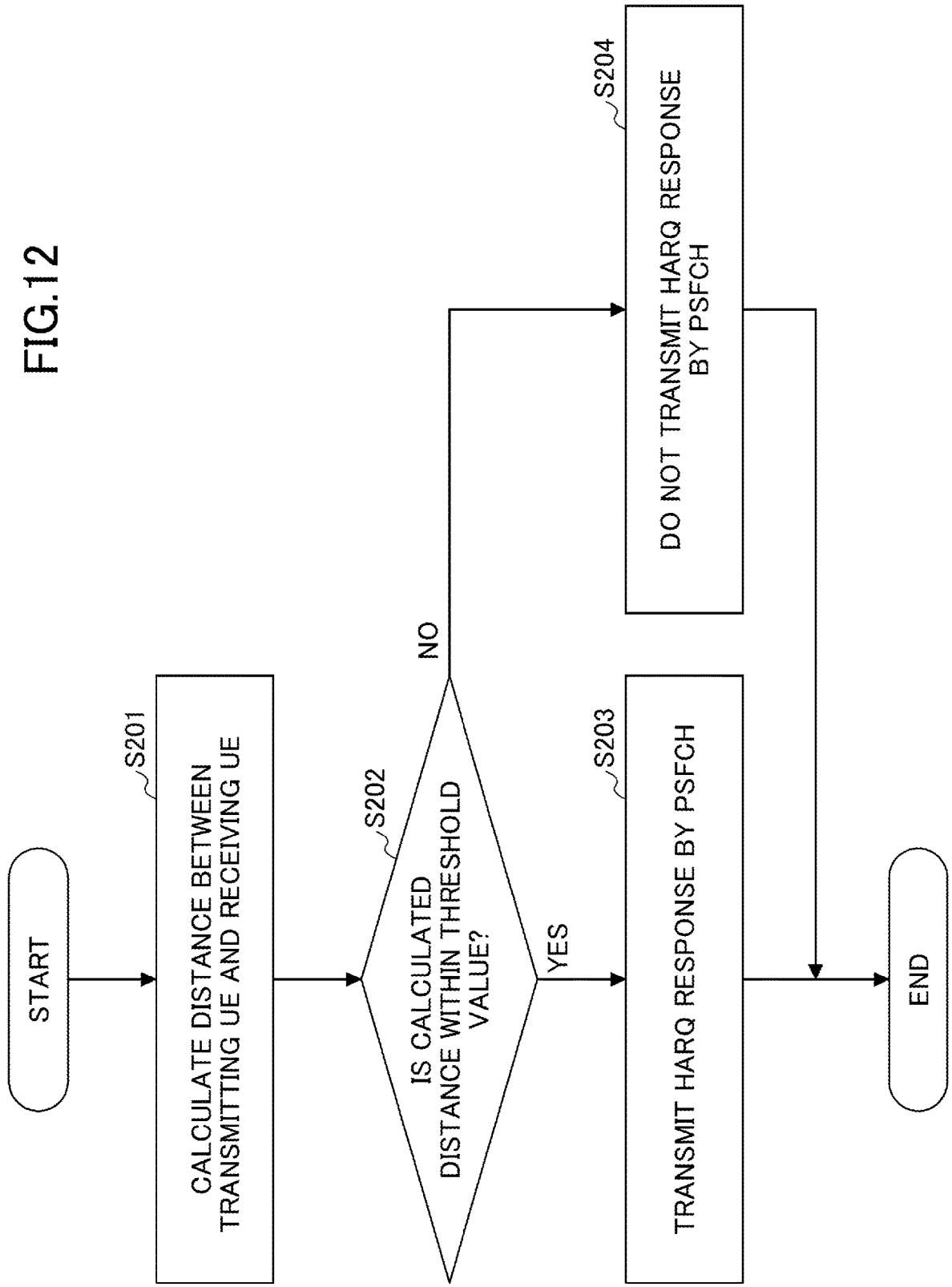
FIG. 12 is a flowchart illustrating an example (1) of a HARQ response in V2X according to an embodiment of the present invention.

FIG. 12 is a flowchart illustrating an example (1) of a HARQ response in V2X according to an embodiment of the present invention. Step S2 illustrated in FIG. 11 is described in detail with reference to FIG. 12.

In step S201, the user equipment 20B calculates the distance between the user equipment 20A and the user equipment 20B by the method described above. Subsequently, the user equipment 20B determines whether the calculated distance is within a threshold value. The threshold value is reported, for example, by an index indicated in Table 1. The distance between the user equipment 20A and the user equipment 20B may be calculated from the geographical location of the user equipment 20A, or may be calculated from the zone or sub-zone where the user equipment 20A is located, or may be calculated from the path loss estimated from the transmission power of the user equipment 20A and the received power at the user equipment 20B.

When the calculated distance is within the threshold value (YES in step S202), the process proceeds to step S203, and when the calculated distance exceeds the threshold value (NO in step S202), the process proceeds to step S204. In step S203, the user equipment 20B transmits a HARQ response by PSFCH. On the other hand, in step S204, the user equipment 20B does not transmit a HARQ response by PSFCH.

Figure 13:
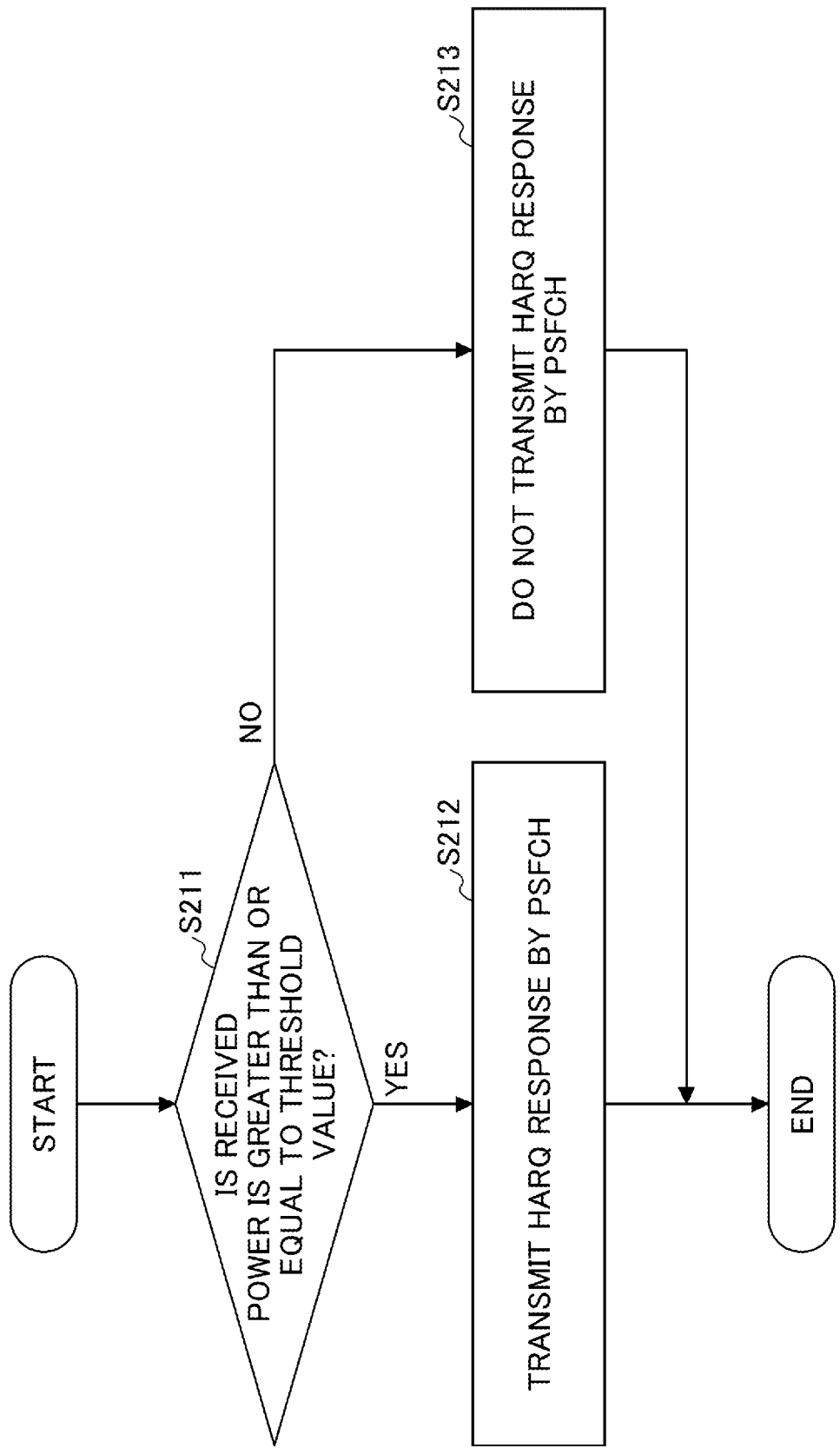
FIG. 13 is a flowchart illustrating an example (2) of a HARQ response in V2X according to an embodiment of the present invention.

FIG. 13 is a flowchart illustrating an example (2) of a HARQ response in V2X according to an embodiment of the present invention. Step S2 illustrated in FIG. 11 is described in detail with reference to FIG. 13.

In step S211, the user equipment 20B determines whether the received power is greater than or equal to a threshold value. The threshold value is reported from the user equipment 20A, for example, via the SCI. When the received power is greater than or equal to the threshold value (YES in step S211), the process proceeds to step S212, and when the received power is less than the threshold value (NO in step S211), the process proceeds to step S213. In step S212, the user equipment 20B transmits a HARQ response by PSFCH. On the other hand, in step S213, the user equipment 20B does not transmit a HARQ response by PSFCH.

According to the embodiment described above, the receiving user equipment 20 can determine whether to execute a HARQ response based on the estimated distance between the transmitting UE 20 and the receiving UE 20 or the received power.

That is, in direct communication between terminals, the efficiency of retransmission control can be improved.

(Apparatus Configuration)

Next, a functional configuration example of the base station apparatus 10 and the user equipment 20 that execute the above-described processes and operations, will be described. The base station apparatus 10 and the user equipment 20 include functions for implementing the above-described embodiments. However, each of the base station apparatus 10 and the user equipment 20 may have only some of the functions of the embodiments.

<Base Station Apparatus 10>

Figure 14:
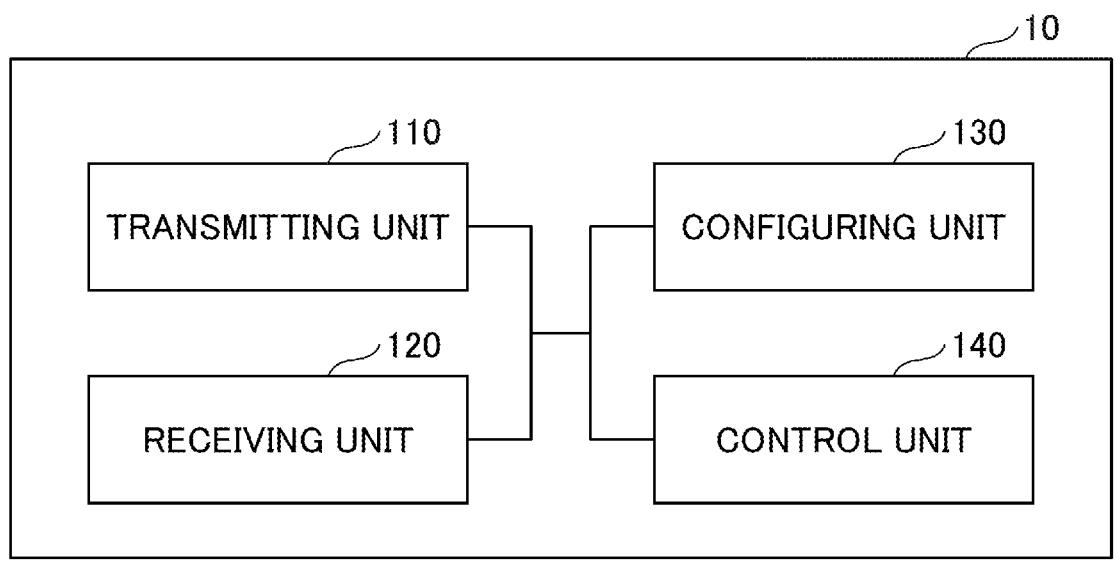
FIG. 14 is a diagram illustrating an example of a functional configuration of a base station apparatus 10 according to the embodiment of the present invention.

FIG. 14 is a diagram illustrating an example of a functional configuration of the base station apparatus 10. As illustrated in FIG. 14, the base station apparatus 10 includes a transmitting unit 110, a receiving unit 120, a configuring unit 130, and a control unit 140. The functional configuration illustrated in FIG. 14 is only an example. As long as the operations according to the embodiment of the present invention can be executed, the functional division and the name of the functional unit may be any functional division and name.

The transmitting unit 110 includes a function of generating signals to be transmitted to the user equipment 20, and transmitting the signals in a wireless manner. The receiving unit 120 includes a function of receiving various signals transmitted from the user equipment 20, and acquiring, for example, information of a higher layer from the received signals. Furthermore, the transmitting unit 110 has a function of transmitting NR-PSS, NR-SSS, NR-PBCH, DL/UL control signals, and DL reference signals, etc., to the user equipment 20.

The configuring unit 130 stores pre-configured configuration information and various kinds of configuration information to be transmitted to the user equipment 20, in a storage device, and reads these pieces of information from the storage device as necessary. The content of the configuration information is, for example, information related to D2D communication and configuring of retransmission control.

As described in the embodiment, the control unit 140 performs processing related to configurations for performing D2D communication by the user equipment 20. Furthermore, the control unit 140 transmits the scheduling of D2D communication to the user equipment 20 via the transmitting unit 110. Further, the control unit 140 determines the parameters related to the retransmission control of the D2D communication and transmits the parameters to the user equipment 20 via the transmitting unit 110. A functional unit related to signal transmission in the control unit 140, may be included in the transmitting unit 110, and a functional unit related to signal reception in the control unit 140, may be included in the receiving unit 120.

<User Equipment 20>

Figure 15:
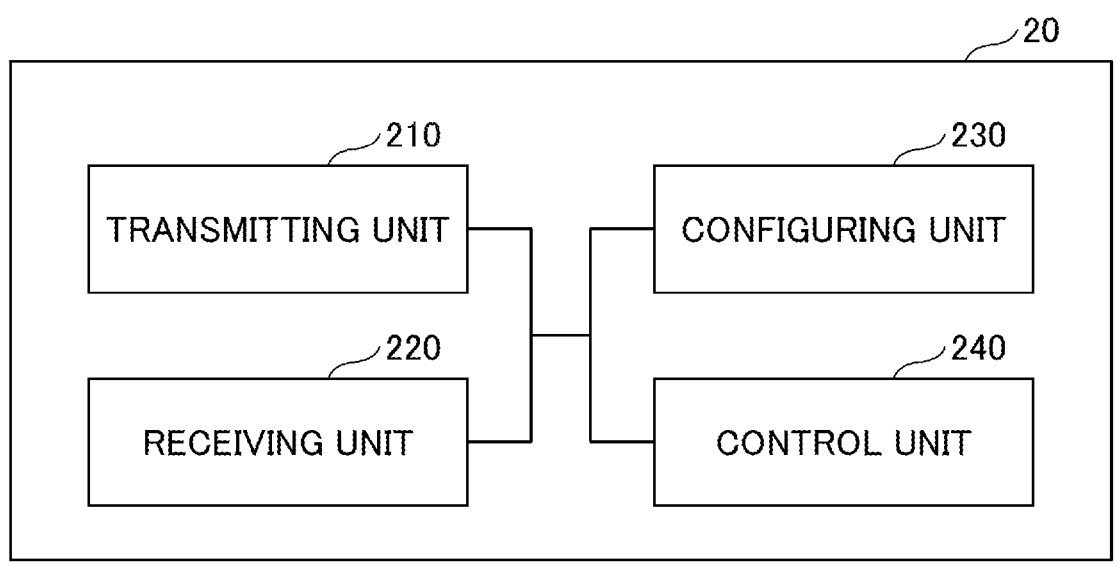
FIG. 15 is a diagram illustrating an example of a functional configuration of a user equipment 20 according to the embodiment of the present invention.

FIG. 15 is a diagram illustrating an example of a functional configuration of the user equipment 20. As illustrated in FIG. 15, the user equipment 20 includes a transmitting unit 210, a receiving unit 220, a configuring unit 230, and a control unit 240. The functional configuration illustrated in FIG. 15 is only an example. As long as the operations according to the embodiment of the present invention can be executed, the functional division and the name of the functional unit may be any functional division and name.

The transmitting unit 210 creates transmission signals from the transmission data and wirelessly transmits the transmission signals. The receiving unit 220 wirelessly receives various kinds of signals and acquires signals of a higher layer from the received signals of the physical layer. Furthermore, the receiving unit 220 has a function of receiving NR-PSS, NR-SSS, NR-PBCH, and DL/UL/SL control signals or reference signals, etc., transmitted from the base station apparatus 10. Furthermore, for example, the transmitting unit 210 may transmit as D2D communication, to another user equipment 20, PSCCH (Physical Sidelink Control Channel), PSSCH (Physical Sidelink Shared Channel), PSDCH (Physical Sidelink Discovery Channel), and PSBCH (Physical Sidelink Broadcast Channel), etc., and the receiving unit 220 may receive, from another user equipment 20, PSCCH, PSSCH, PSDCH, or PSBCH, etc.

The configuring unit 230 stores various kinds of configuration information received from the base station apparatus 10 or the user equipment 20, by the receiving unit 220, in a storage device, and reads these pieces of information from the storage device as necessary. Furthermore, the configuring unit 230 also stores pre-configured configuration information. The content of the configuration information is, for example, information related to configuring of D2D communication.

As described in the embodiment, the control unit 240 controls the D2D communication between the user equipment 20 and another user equipment 20. Furthermore, the control unit 240 performs a process related to HARQ of D2D communication. Further, the control unit 240 may perform scheduling of D2D communication and transmit parameters related to retransmission control to another user equipment 20. A functional unit related to signal transmission in the control unit 240 may be included in the transmission unit 210, and a functional unit related to signal reception in the control unit 240 may be included in the reception unit 220.

(Hardware Configuration)

The block diagrams (FIGS. 14 and 15) used for describing the embodiment described above are of blocks of functional units. These functional blocks (constituent units) are implemented by any combination of at least one of hardware and software. Methods for implementing each functional block are not particularly limited. That is, each functional block may be implemented by using one device in which elements are physically or logically combined, or two or more devices physically or logically separated may be directly or indirectly (for example, in a wired manner, a wireless manner) connected to each other, and each functional block may be implemented by these plural devices. The functional blocks may be implemented by combining software with the above one device or a plurality of devices.

The functions include determining, deciding, judging, calculating, computing, processing, deriving, investigating, searching, confirming, receiving, transmitting, outputting, accessing, resolving, selecting, adopting, establishing, comparing, assuming, expecting, considering, broadcasting, notifying, communicating, forwarding, configuring, reconfiguring, allocating, mapping, assigning, etc.; however, the functions are not limited as such. For example, a function block (constituent unit) that implements the transmission function is referred to as a transmitting unit or a transmitter. In any case, as described above, the implementation method is not particularly limited.

Figure 16:
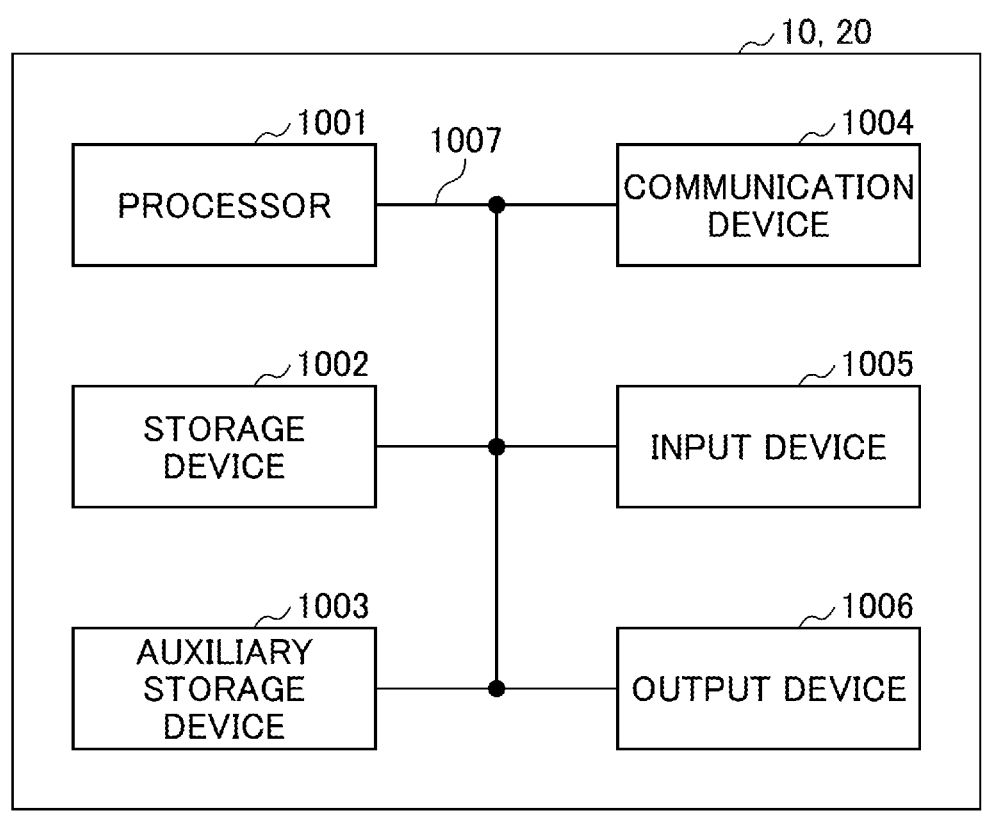
FIG. 16 is a diagram illustrating an example of a hardware configuration of the base station apparatus 10 or the user equipment 20 according to the embodiment of the present invention.

For example, the base station apparatus 10 and the user equipment 20, etc., according to the embodiment of the present disclosure may function as a computer that performs processes of the radio communication method according to the present disclosure. FIG. 16 is a diagram illustrating an example of a hardware configuration of the base station apparatus 10 and the user equipment 20 according to the embodiment of the present disclosure. The base station apparatus 10 and the user equipment 20 described above may be formed as a computer apparatus physically including a processor 1001, a storage device 1002, an auxiliary storage device 1003, a communication device 1004, an input device 1005, an output device 1006, a bus 1007, etc.

Note that in the following description, the term "device" can be read as a circuit, a device, a unit. The hardware configuration of the base station apparatus 10 and the user equipment 20 may be configured to include one or more devices illustrated in the figure, or may be configured to not include some of the devices.

The functions of the base station apparatus 10 and the user equipment 20 are implemented by loading predetermined software (program) in hardware such as the processor 1001 and the storage device 1002, computing by the processor 1001, controlling communication by the communication device 1004, and controlling at least one of reading and writing of data in the storage device 1002 and the auxiliary storage device 1003.

The processor 1001 operates, for example, the operating system to control the entire computer. The processor 1001 may be formed of a central processing unit (CPU) including an interface with a peripheral device, a control device, an arithmetic device, and a register. For example, the above control unit 140 and the control unit 240, etc., may be implemented by the processor 1001.

Furthermore, the processor 1001 loads a program (program code), a software module, or data, etc., from at least one of the auxiliary storage device 1003 and the communication device 1004, into the storage device 1002, and executes various processes according to the program, the software module, or the data. As the program, a program for causing a computer to execute at least part of the operations described in the above embodiment is used. For example, the control unit 140 of the base station apparatus 10 illustrated in FIG. 14 may be implemented by a control program stored in the storage device 1002 and operating on the processor 1001. Furthermore, the control unit 240 of the user equipment 20 illustrated in FIG. 15 may be implemented by a control program stored in the storage device 1002 and operating on the processor 1001. Although it has been described that the above-described various processes are executed by one processor 1001, the processes may be executed simultaneously or sequentially by two or more processors 1001. The processor 1001 may be implemented with one or more chips. Note that the program may be transmitted from the network via an electric communication line.

The storage device 1002 is a computer-readable recording medium and may be formed of at least one of a ROM (Read Only Memory), an EPROM (Erasable Programmable ROM), an EEPROM (Electrically Erasable Programmable ROM), and a RAM (Random Access Memory). The storage device 1002 may be referred to as a register, a cache, and a main memory, etc. The storage device 1002 can store executable programs (program codes), software modules, etc., for implementing the communication method according to the embodiment of the present disclosure.

The auxiliary storage device 1003 is a computer-readable recording medium, and may be formed of, for example, at least one of an optical disk such as a CD-ROM (Compact Disc ROM), a hard disk drive, a flexible disk, a magneto-optical disk (for example, a compact disk, a digital versatile disk, and a Blu-ray (registered trademark) disk), a smart card, a flash memory (for example, a card, a stick, and a key drive), a floppy (registered trademark) disk, and a magnetic strip, etc. The above-described storage medium may be, for example, a database including at least one of the storage device 1002 and the auxiliary storage device 1003, a server, or another appropriate medium.

The communication device 1004 is hardware (transmission/reception device) for performing communication between computers via at least one of a wired network and a wireless network, and is also referred to as a network device, a network controller, a network card, and a communication module, etc., for example. The communication device 1004 may be configured by including a high-frequency switch, a duplexer, a filter, a frequency synthesizer, etc., in order to implement at least one of frequency division duplex (FDD) and time division duplex (TDD). For example, a transmission/reception antenna, an amplifier unit, a transmission/reception unit, and a transmission line interface, etc., may be implemented by the communication device 1004. In the transmission/reception unit, the transmission unit and the reception unit may be physically or logically separated from each other.

The input device 1005 is an input device (for example, a keyboard, a mouse, a microphone, a switch, a button, and a sensor, etc.) that accepts input from the outside. The output device 1006 is an output device (for example, a display, a speaker, and an LED lamp, etc.) that performs output to the outside. Note that the input device 1005 and the output device 1006 may be integrated (for example, a touch panel).

Furthermore, the respective devices such as the processor 1001 and the storage device 1002 are connected by a bus 1007 for communicating information. The bus 1007 may be formed of a single bus or may be formed by using different buses between the devices.

Furthermore, the base station apparatus 10 and the user equipment 20 may include hardware such as a microprocessor, a digital signal processor (DSP), an application specific integrated circuit (ASIC), a programmable logic device (PLD), and a field programmable gate array (FPGA), and a part of or all of the functional blocks may be implemented by the hardware. For example, the processor 1001 may be implemented by using at least one of these hardware elements.

(Overview of Embodiment)

As described above, according to the embodiment of the present invention, there is provided a user equipment including a receiving unit configured to receive a physical control channel and a physical shared channel from another user equipment; a control unit configured to calculate a distance that is an estimated distance between the another user equipment and the user equipment, based on information acquired via the physical control channel; and a transmitting unit configured to determine whether to transmit, via a channel used for transmitting and receiving a response relating to retransmission control, the response relating to the retransmission control of the physical shared channel transmitted from the another user equipment, based on the calculated distance.

With the above configuration, the receiving user equipment 20 can determine whether to execute a HARQ response based on the estimated distance between the transmitting UE 20 and the receiving UE 20 or received power. That is, in direct communication between terminals, the efficiency of retransmission control can be improved.

The transmitting unit may transmit, to the another user equipment via the channel used for transmitting and receiving the response relating to the retransmission control, the response relating to the retransmission control of the physical shared channel transmitted from the another user equipment, when the calculated distance does not exceed a predetermined threshold value included in the information acquired via the physical control channel. With this configuration, the receiving user equipment 20 can determine whether to execute a HARQ response based on the estimated distance between the transmitting UE 20 and the receiving UE 20.

The control unit may calculate the estimated distance between the another user equipment and the user equipment, based on information indicating a geographic location of the another user equipment included in the information acquired via the physical control channel and information indicating a geographic location of the user equipment. With this configuration, the receiving user equipment 20 can determine whether to execute a HARQ response based on the estimated distance between the transmitting UE 20 and the receiving UE 20.

Each of the information indicating the geographic location of the another user equipment and the information indicating the geographic location of the user equipment, may be indicated by: a zone in a grid defined by a width corresponding to a latitude and a length corresponding to a longitude; or a sub-zone obtained by dividing the zone. With this configuration, the user equipment 20 can process information indicating the geographical locations of the transmitting UE 20 and the receiving UE 20 by a small amount of information.

The control unit may calculate, as the estimated distance between the another user equipment and the user equipment, a distance between a center of the zone or the sub-zone in which the another user equipment is located and a center of the zone or the sub-zone in which the user equipment is located. With this configuration, the user equipment 20 can calculate the distance between the transmitting UE 20 and the receiving UE 20 by a small computational amount.

The control unit may calculate the estimated distance between the another user equipment and the user equipment, based on information indicating transmission power of the another user equipment included in the information acquired via the physical control channel and RSRP (Reference Signal Received Power) measured at the user equipment. With this configuration, the receiving user equipment 20 can determine whether to execute a HARQ response based on the received power of a signal transmitted from the transmitting UE 20.

(Supplement of Embodiment)

The embodiment of the present invention is described above; however the disclosed invention is not limited to the embodiment, and a person ordinarily skilled in the art will appreciate various variations, modifications, alternatives, replacements, and so forth. Specific examples of numerical values are used in order to facilitate understanding of the invention. However, these numerical values are merely an example, and any other appropriate values may be used, except as indicated otherwise. The separations of the items in the above description are not essential to the present invention. Depending on necessity, subject matter described in two or more items may be combined and used, and subject matter described in an item may be applied to subject matter described in another item (provided that they do not contradict). A boundary of a functional unit or a processor in the functional block diagrams may not necessarily correspond to a boundary of a physical component. An operation by a plurality of functional units may be physically executed by a single component, or an operation of a single functional unit may be physically executed by a plurality of components. The order of the processes in each of the processing procedures described in the embodiment may be re-arranged, provided that they do not contradict. For the convenience of description, the base station apparatus 10 and the user equipment 20 are described by using the functional block diagrams; however, such devices may be implemented in hardware, software, or combinations thereof. The software to be executed by the processor included in the base station apparatus 10 in accordance with the embodiment of the present invention and the software to be executed by the processor included in the user equipment 20 in accordance with the embodiment of the present invention may be stored in any appropriate storage medium, such as a random access memory (RAM), a flash memory, a read-only memory (ROM), an EPROM, an EEPROM, a register, a hard disk drive (HDD), a removable disk, a CD-ROM, a database, a server, and so forth.

Indication of information is not limited to the aspect or embodiment described in this disclosure and may be given by using any other method. For example, the notification of information may be given physical layer signaling (for example, Downlink Control Information (DCI), uplink control information (UCI)), higher layer signaling (for example, radio resource control (RRC) signaling, medium access control (MAC) signaling, broadcast information (master information block (MIB), system information block (SIB))), other signals, or a combination thereof. Further, the RRC signaling may be referred to as an "RRC message" and may be, for example, an RRC connection setup message, an RRC connection reconfiguration message, etc.

Each aspect and embodiment described in this disclosure is applicable to at least one of LTE, LTE-A, SUPER 3G, IMT-Advanced, 4G (4th generation mobile communication system), 5G (5th generation mobile communication system), NR (new Radio), future radio access (FRA), NR (New Radio), W-CDMA (registered trademark), GSM (registered trademark), CDMA2000, ultra-mobile broadband (UMB), IEEE 802.11 (Wi-Fi (registered trademark)), IEEE 802.16 (WiMAX (registered trademark)), IEEE 802.20, ultra-wideband (UWB), Bluetooth (registered trademark), and systems using any other appropriate systems and next generation systems expanded on the basis of the systems. Furthermore, each aspect and embodiment described in this disclosure may be applied to a combination of a plurality of systems (for example, a combination of at least one of LTE and LTE-A, and 5G, etc.)

The processing procedures, the sequences, the flowcharts, etc., of the respective aspects/embodiments described in this specification may be reversed in order unless there is a contradiction. For example, the method described in this disclosure presents elements of various steps in an exemplary order and is not limited to a presented specific order.

In the present specification, a specific action that is supposed to be performed by the base station apparatus 10 may be performed by an upper node in some cases. In the network configured with one or a plurality of network nodes including the base station apparatus 10, various actions performed for communication with the user equipment 20 can be obviously performed by at least one of the base station apparatus 10 and any network node (for example, an MME or an S-GW, etc., is considered, but it is not limited thereto) other than the base station apparatus 10. The example in which the number of network nodes excluding the base station apparatus 10 is one has been described above, but the other network nodes may be a combination of a plurality of other network nodes (for example, an MME and an S-GW).

Information or signals, etc., described in the present disclosure can be output from the higher layer (or the lower layer) to the lower layer (or the higher layer). Information, etc., may be input/output via a plurality of network nodes.

Input and output information, etc., may be stored in a specific place (for example, a memory) or may be managed by using a management table. Input and output information, etc., may be overwritten, updated, or additionally written.

Output information, etc., may be deleted. Input information, etc., may be transmitted to another device.

The determination according to the present disclosure may be performed in accordance with a value (0 or 1) indicated by one bit, may be performed in accordance with a Boolean value (true or false), or may be performed by a comparison of numerical values (for example, a comparison with a value).

Software can be interpreted widely to mean a command, a command set, a code, a code segment, a program code, a program, a subprogram, a software module, an application, a software application, a software package, a routine, a subroutine, an object, an executable file, an execution thread, a procedure, a function, etc., regardless of whether software is called software, firmware, middleware, a microcode, a hardware description language, or any other name.

Further, software, commands, information, etc., may be transmitted and received via a transmission medium. For example, when software is transmitted from a web site, a server, or any other remote source using at least one of a wired technology (a coaxial cable, a fiber optic cable, a twisted pair, or a digital subscriber line (DSL), etc.) and a wireless technology (infrared rays or a microwave, etc.), at least one of the wired technology and the wireless technology is included in a definition of a transmission medium.

Information, signals, etc., described in the present disclosure may be indicated using any one of a variety of different techniques. For example, data, instructions, commands, information, signals, bits, symbols, chips, etc., which are mentioned throughout the above description may be indicated by voltages, currents, electromagnetic waves, magnetic particles, optical fields or photons, or an arbitrary combination thereof.

The terms described in this disclosure and terms necessary for understanding this specification may be replaced with terms having the same or similar meanings. For example, at least one of a channel and a symbol may be a signal (signaling). Further, a signal may be a message. Further, a component carrier (CC) may be referred to as a "carrier frequency," a "cell," or a "frequency carrier", etc.

The terms "system" and "network" used in the present disclosure are used interchangeably.

Further, information, parameters, etc., described in the present disclosure may be indicated by using absolute values, may be indicated by using relative values from predetermined values, or may be indicated by using corresponding other information. For example, radio resources may be those indicated by an index.

The names used for the above-described parameters are not limited in any respect. Further, mathematical formulas, etc., using the parameters may be different from those explicitly disclosed in the present disclosure. Since various channels (for example, the PUCCH, the PDCCH, etc.) and information elements, etc., can be identified by suitable names, the various names allocated to the various channels and the information elements are not limited in any respect.

In the present disclosure, the terms "base station," "radio base station," "base station apparatus," "fixed station," "Node B," "eNodeB (eNB)," "gNodeB (gNB)," "access point," "transmission point," "reception point," "transmission/reception point," "cell," "sector," "sector group," "carrier," "component carrier" can be used interchangeably. The base station is also referred to as a macro cell, a small cell, a Femto cell, a pico cell, etc.

The base station can accommodate one or more (for example, three) cells. When the base station accommodates a plurality of cells, the entire coverage area of the base station can be divided into a plurality of smaller areas, and each smaller area can provide communication service through a base station subsystem (for example, a small indoor base station remote radio head (RRH)). The term "cell" or "sector" refers to part or all of the coverage area of at least one of the base station and the base station subsystem that performs communication service in the coverage.

In the present disclosure, terms such as "MS: Mobile Station", "user terminal", "UE: User Equipment", and "terminal", etc., can be used interchangeably.

The mobile station is also referred to as a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user agent, a mobile client, a client, or other appropriate terms.

At least one of the base station and the mobile station may be referred to as a transmission device, a reception device, a communication device, etc. Note that at least one of the base station and the mobile station may be a device mounted on a mobile body, the mobile body itself, etc. The mobile body may be a vehicle (for example, a car, an airplane, etc.), a mobile body that moves unmanned (for example, a drone, an automatically driven vehicle, etc.), or a robot (manned type or unmanned type). Note that at least one of the base station and the mobile station also includes a device which does not necessarily move during the communication operation. For example, at least one of the base station and the mobile station may be an IoT (Internet of Things) device such as a sensor.

Furthermore, the base station in the present disclosure may be read as a user terminal. For example, the communication between the base station and the user terminal is replaced with communication (for example, may be referred to as D2D (Device-to-Device), V2X (Vehicle-to-Everything)) between a plurality of the user equipments 20, and each aspect/embodiment of the present disclosure may be applied to the configuration after replacement. In this case, the user equipment 20 may have the functions of the base station apparatus 10 described above. Furthermore, terms such as "uplink" and "downlink" may also be read as terms corresponding to inter-terminal communication (for example, "side"). For example, uplink channels, downlink channels, etc., may be read as side channels.

Similarly, the user terminal in the present disclosure may be read as a base station. In this case, the base station may include the functions of the above-described user terminal.

In some cases, the terms "determining" and "deciding" used in the disclosure include various operations. The terms "determining" and "deciding" can include, for example, "determination" and "decision" for judging, calculating, computing, processing, deriving, investigating, looking-up, or search inquiry (for example, looking-up in a table, a database, or other data structures), and ascertaining operations. In addition, the terms "determining" and "judging" can include "determination" and "decision" for receiving (for example, information reception), transmitting (for example, information transmission), input, output, and accessing (for example, accessing data in a memory) operations. The terms "determining" and "judging" can include "determination" and "decision" for resolving, selecting, choosing, establishing, and comparing operations. That is, the terms "determining" and "judging" can include "determination" and "decision" for any operation. Furthermore, "determining (deciding)" may be read as "assuming", "expecting", and "considering".

The terms "connected" and "coupled" or all of the modifications of the terms mean all of direct and indirect connections or couplings between two or more elements and can include a case in which one or more intermediate elements are present between two "connected" or "coupled" elements. The coupling or connection between elements may be physical coupling or connection, logical coupling or connection, or a combination thereof. For example, "connect" may be read as "access". In the disclosure, it can be considered that two elements are "connected" or "coupled" to each other by using one or more electric wires, at least one of a cable and a printed electrical connection and by using electromagnetic energy with a wavelength in a radio frequency domain, a microwave domain, and an optical (both visible and invisible) domain as some non-restrictive and incomprehensive examples.

The reference signal can be abbreviated to RS and may be called a pilot signal according to the standard to be applied.

In the present disclosure, the term "on the basis of" used in the specification does not mean "on the basis of only" unless otherwise stated. In other words, the term "on the basis of" means both "on the basis of only" and "on the basis of at least".

In the present disclosure, any reference to elements with the names "first" and "second" used in the specification does not generally limit the number of elements or the order of the elements. These names can be used as a convenient method for distinguishing two or more elements in the disclosure. Therefore, a reference to the first and second elements does not mean that only two elements can be used or that the first element needs to precede the second element in some form.

The term "means" in the structure of each of the above-mentioned devices may be substituted with, for example, a "unit", a "circuit", or a "device".

In the present disclosure, when "include," "including," and modifications thereof are used, these terms are intended to be inclusive, similarly to the term "comprising". In addition, the term "or" used in the present disclosure does not mean exclusive OR.

The radio frame may be formed of one or more frames in the time domain. In the time domain, each of the one or more frames may be referred to as a subframe. The subframe may further include one or more slots in the time domain. The subframe may be a fixed time length (for example, 1 ms) independent of the numerology.

The numerology may be a communication parameter applied to at least one of transmission and reception of a certain signal or channel. The numerology may indicate at least one of, for example, a subcarrier spacing (SCS), a bandwidth, a symbol length, a cyclic prefix length, a transmission time interval (TTI), a number of symbols per TTI, a radio frame configuration, a particular filtering process performed in the frequency domain by the transceiver, a specific windowing process performed in the time domain by the transceiver, etc.

A slot may be formed of one or more symbols (OFDM (Orthogonal Frequency Division Multiplexing) symbol, SC-FDMA (Single Carrier Frequency Division Multiple Access) symbol, etc.) in the time domain. The slot may be a time unit based on the numerology.

A slot may include a plurality of minislots. Each minislot may be formed of one or more symbols in the time domain. Furthermore, the minislot may be referred to as a subslot. A minislot may be formed of fewer symbols than a slot. The PDSCH (or PUSCH) transmitted in units of time greater than the minislots, may be referred to as PDSCH (or PUSCH) mapping type A. The PDSCH (or PUSCH) transmitted using minislots may be referred to as PDSCH (or PUSCH) mapping type B.

Radio frames, subframes, slots, minislots, and symbols all represent time units for transmitting signals. Radio frames, subframes, slots, minislots, and symbols may respectively be referred to by different names.

For example, one subframe may be referred to as a transmission time interval (TTI), or a plurality of consecutive subframes may be referred to as a TTI, or one slot or one minislot may be referred to as a TTI. That is, at least one of a subframe and TTI may be a subframe (1 ms) in existing LTE, a period shorter than 1 ms (for example, 1-13 symbols), or a period longer than 1 ms. Note that the unit representing TTI may be referred to as a slot, a minislot, etc., instead of a subframe.

Here, the TTI refers to the minimum time unit of scheduling in radio communication, for example. For example, in the LTE system, the base station performs scheduling for allocating radio resources (frequency bandwidth, transmission power, etc., that can be used in each user equipment 20) in units of TTIs, to each user equipment 20. Note that the definition of TTI is not limited as such.

The TTI may be a transmission time unit such as a channel coded data packet (transport block), a code block, a codeword, etc., or may be a processing unit such as scheduling, link adaptation, etc. Note that when a TTI is given, a time interval (for example, the number of symbols) in which a transport block, a code block, a code word, etc., is actually mapped, may be shorter than the TTI.

Note that when one slot or one minislot is referred to as a TTI, one or more TTIs (i.e., one or more slots or one or more minislots) may be the minimum time unit of scheduling. Also, the number of slots (the number of minislots) constituting the minimum time unit of the scheduling, may be controlled.

A TTI having a time length of 1 ms may be referred to as a regular TTI (TTI in LTE Rel. 8-12), a normal TTI, a long TTI, a regular subframe, a normal subframe, a long subframe, a slot, etc. A TTI shorter than the regular TTI may be referred to as a reduced TTI, a short TTI, a partial or fractional TTI, a reduced subframe, a short subframe, a minislot, a subslot, a slot, etc.

Note that a long TTI (for example, a regular TTI, a subframe, etc.) may be read as a TTI having a time length exceeding 1 ms, and a short TTI (for example, a reduced TTI, etc.) may be read as a TTI having a TTI length that is less than the TTI length of the long TTI and greater than or equal to 1 ms.

The resource block (RB) is a resource allocation unit in the time domain and the frequency domain, and may include one or more consecutive subcarriers in the frequency domain. The number of subcarriers included in the RB may be the same irrespective of the numerology, for example, the number may be 12. The number of subcarriers included in the RB may be determined based on the numerology.

Furthermore, the time domain of the RB may include one or more symbols, and may have a length of one slot, one minislot, one subframe, or one TTI. Each TTI, each subframe, etc., may be formed of one or more resource blocks.

Note that one or more RBs may be referred to as a physical resource block (PRB), a subcarrier group (SCG: Sub-Carrier Group), a resource element group (REG: Resource Element Group), a PRB pair, and an RB pair, etc.

Furthermore, the resource block may be formed of one or more resource elements (RE). For example, the one RE may be a radio resource area of one subcarrier and one symbol.

A bandwidth part (BWP) (which may be referred to as partial bandwidth) may represent a subset of consecutive common resource blocks (RBs) for a certain numerology, in a certain carrier. Here, the common RB may be identified by the index of the RB based on the common reference point of the carrier. The PRB may be defined by a certain BWP and numbered in the BWP.

The BWP may include BWP for UL (UL BWP) and BWP for DL (DL BWP). For the UE, one or more BWPs may be configured within one carrier.

At least one of the configured BWPs may be active, and the UE does not have to assume transmitting and receiving predetermined signals/channels outside of the active BWP. Note that a "cell", a "carrier", etc., in the present disclosure may be read as "BWP".

Structures such as the radio frames, subframes, slots, minislots, and symbols described above are merely illustrative. For example, configurations such as the number of subframes included in the radio frame, the number of slots per subframe or radio frame, the number of minislots included in the slot, the number of symbols and RBs included in the slot or minislot, the number of subcarriers included in the RB, the number of symbols in the TTI, the symbol length, the cyclic prefix (CP) length, etc., may be variously changed.

In the present disclosure, if an article is added by translation, such as a, an, the, etc., in English, the present disclosure may include a case where the noun following the article is plural.

In the present disclosure, the term "A and B are different" may mean "A and B are different from each other". Note that this term may mean "A and B are each different from C". Terms such as "separated", "coupled", etc., may also be interpreted in the same manner as "different".

Each aspect/embodiment described in the present disclosure may be used singly or in combination, or may be used by being switched in accordance with the execution. Furthermore, reporting of predetermined information (for example, reporting "being X") is not limited to being reporting explicitly; this may be done implicitly (for example, not reporting the predetermined information).

Note that in the present disclosure, the HARQ response is an example of response relating to retransmission control. PSSCH is an example of a physical shared channel. PSFCH is an example of a channel used for transmitting and receiving a response relating to retransmission control. PSCCH is an example of a physical control channel. The transmitting unit 210 or the receiving unit 220 is an example of a communicating unit.

Although the present disclosure has been described in detail above, it will be obvious to those skilled in the art that the present disclosure is not limited to the embodiments described herein. The present disclosure can be implemented as modifications and variations without departing from the spirit and scope of the present disclosure as defined by the scope of the claims. Therefore, the description of the present disclosure is for the purpose of illustration and does not have any restrictive meaning to the present disclosure.

REFERENCE SIGNS LIST

10 base station apparatus
110 transmitting unit
120 receiving unit
130 configuring unit
140 control unit
20 user equipment
210 transmitting unit
220 receiving unit
230 configuring unit
240 control unit
1001 processor
1002 storage device
1003 auxiliary storage device
1004 communication device
1005 input device
1006 output device

The invention claimed is:

1. A terminal comprising:
a controller that:
  determines a zone ID, based on latitude and longitude indicating a geographic location of the terminal; and
  sets, as a communication range requirement of a terminal, a value selected from predetermined numbers that correspond to communication ranges, respectively; and
a transceiver that transmits, to another terminal using communication between terminals, control information including the zone ID and the selected value, wherein the control information is used to determine whether transmission of a hybrid automatic repeat request (HARQ) response is enabled,
wherein the zone ID and the selected value are associated with information related to priority order.

2. A communication system comprising:
a first terminal; and
a second terminal, wherein
the first terminal:
  determines a zone ID, based on latitude and longitude indicating a geographic location of the first terminal;
  sets, as a communication range requirement of a terminal, a value selected from predetermined numbers that correspond to communication ranges, respectively; and
  transmits, to the second terminal using communication between terminals, control information including the zone ID and the selected value, wherein the control information is used to determine whether transmission of a hybrid automatic repeat request (HARQ) response is enabled,
  wherein the zone ID and the selected value are associated with information related to priority order, and
the second terminal receives, from the first terminal, the control information.

3. A communication method performed by a terminal, the communication method comprising:
determining a zone ID, based on latitude and longitude indicating a geographic location of the terminal;
setting, as a communication range requirement of a terminal, a value selected from predetermined numbers that correspond to communication ranges, respectively; and
transmitting, to another terminal using communication between terminals, control information including the zone ID and the selected value, wherein the control information is used to determine whether transmission of a hybrid automatic repeat request (HARQ) response is enabled,
wherein the zone ID and the selected value are associated with information related to priority order.

* * * * *